US011292675B1

(12) United States Patent
Gillard et al.

(10) Patent No.: US 11,292,675 B1
(45) Date of Patent: Apr. 5, 2022

(54) APPARATUS HAVING INTEGRATED ELECTROMAGNETIC COIL AND SUCTION CUP ASSEMBLY FOR DESTACKING A STACK OF BLANKS

(71) Applicant: Ford Global Technologies, LLC, Dearborn, MI (US)

(72) Inventors: Alan John Gillard, Dearborn, MI (US); Franco Leonardi, Dearborn Heights, MI (US); Matthew Meier, St. Johns, MI (US); Patrick McCleer, Holland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/094,555

(22) Filed: Nov. 10, 2020

(51) Int. Cl.
*B25J 15/06* (2006.01)
*B65G 59/04* (2006.01)
*B65G 47/91* (2006.01)
*B21D 43/24* (2006.01)

(52) U.S. Cl.
CPC ............. *B65G 59/04* (2013.01); *B21D 43/24* (2013.01); *B25J 15/0608* (2013.01); *B25J 15/0616* (2013.01); *B65G 47/917* (2013.01); *B65G 47/912* (2013.01)

(58) Field of Classification Search
CPC .... B65G 59/04; B65G 47/917; B65G 47/912; B65G 47/91; B65G 47/92; B66C 1/02; B66C 1/0243; B25J 15/0616; B25J 15/06; B21D 43/24; B65H 3/0816; B65H 3/0808
See application file for complete search history.

(56) References Cited

U.S. PATENT DOCUMENTS

| | | | | |
|---|---|---|---|---|
| 2,621,807 A | * | 12/1952 | Rendich | B23Q 16/001 269/54.5 |
| 2,847,212 A | * | 8/1958 | Stem | B21D 43/24 271/18.1 |
| 2,860,874 A | * | 11/1958 | Gulick | B65G 59/045 271/11 |
| 2,999,687 A | * | 9/1961 | Hommel | B65G 59/045 271/18.1 |
| 3,353,822 A | * | 11/1967 | Dangelmaier | B65G 54/02 271/18.1 |
| 4,121,865 A | * | 10/1978 | Littwin, Sr. | B66C 1/0218 294/186 |
| 9,914,599 B2 | | 3/2018 | Namuduri et al. | |
| 10,000,342 B2 | * | 6/2018 | Alonso Ramila | B65G 47/91 |
| 10,322,890 B2 | | 6/2019 | Golovashchenko et al. | |
| 2008/0163661 A1 | * | 7/2008 | Meichtry | B21D 1/06 72/56 |
| 2017/0158441 A1 | * | 6/2017 | Namuduri | B65H 3/16 |

(Continued)

FOREIGN PATENT DOCUMENTS

| | | | | |
|---|---|---|---|---|
| GB | 2462499 A | * | 2/2010 | ............. B21D 43/24 |
| GB | 2462636 | | 2/2010 | |

(Continued)

*Primary Examiner* — Gregory W Adams
(74) *Attorney, Agent, or Firm* — Burris Law, PLLC

(57) ABSTRACT

An apparatus for destacking a blank from a stack of blanks includes an electromagnetic-suction device including a primary suction device and an electromagnetic device, where the primary suction device is integrated with the electromagnetic device. The apparatus includes an auxiliary suction device proximate to the electromagnetic-suction device.

15 Claims, 11 Drawing Sheets

(56) References Cited

U.S. PATENT DOCUMENTS

2018/0105373 A1\* 4/2018 Golovashchenko ... B65G 47/92
2020/0122341 A1   4/2020 Leonardi et al.

FOREIGN PATENT DOCUMENTS

| JP | 63022447 A  * | 1/1988 | |
|----|---------------|--------|---|
| SU | 1712286 A1 * | 2/1992 | |
| WO | WO-2009034891 A1 * | 3/2009 | ............. B21D 43/24 |

\* cited by examiner

APPARATUS HAVING INTEGRATED ELECTROMAGNETIC COIL AND SUCTION CUP ASSEMBLY FOR DESTACKING A STACK OF BLANKS

FIELD

The present disclosure relates to an apparatus for destacking blanks, and more particularly, sheet metal.

BACKGROUND

The statements in this section merely provide background information related to the present disclosure and may not constitute prior art.

In a material forming operation, such as a stamping operation, a stack of blanks is generally positioned in proximity to a stamping press and automatically fed into the stamping press by a material handling machine, such as a material handling robot. Tool and die surfaces of the stamping press receive the blanks and form the blanks into a desired shape. The robot includes an end-effector, which is moved to a position above the stack of blanks, grasps and lifts the uppermost blank from the stack, and feeds the uppermost blank into the stamping press or onto a conveyor that transports the uppermost blank to the stamping press.

To facilitate the grasping operation of the end-effector, the stack of blanks may be destacked or separated before the end-effector grasps the uppermost blank. Typical destacking methods may not be suitable for high-volume manufacturing cycle times which require automated, rapid, and robust blank destacking. Also, if two or more blanks are picked up by the robot, the system experiences a disruption and stops the production line, resulting in downtime of the manufacturing process.

These issues associated with destacking apparatus relative to material blanks, among other issues associated with destacking material blanks, are addressed by the present disclosure.

SUMMARY

This section provides a general summary of the disclosure and is not a comprehensive disclosure of its full scope or all of its features.

The present disclosure provides an apparatus for destacking a blank from a stack of blanks. The apparatus includes an electromagnetic-suction device including a primary suction device and an electromagnetic device, where the primary suction device is integrated with the electromagnetic device. The apparatus includes an auxiliary suction device proximate to the electromagnetic-suction device.

In some forms, the primary suction device includes a suction cup that is arranged at a first face of the electromagnetic device to directly contact the blank.

In some forms, the electromagnetic device defines an aperture and includes an electromagnetic coil.

In some forms, the primary suction device includes a shaft extending through the aperture and a suction cup connected at one end of the shaft.

In some forms, the electromagnetic coil is disposed about the shaft.

In some forms, the auxiliary suction device contacts the electromagnetic device.

In some forms, the auxiliary suction device includes an auxiliary suction cup and an auxiliary shaft attached to the auxiliary suction cup, and the auxiliary suction cup is adapted to contact the blank.

In some forms, the auxiliary suction cup contacts the electromagnetic device.

In some forms, the auxiliary suction cup includes an auxiliary electromagnetic coil disposed therein.

In some forms, the apparatus further includes a manifold, where the manifold contacts a first surface of the electromagnetic-suction device, and where the auxiliary suction device contacts a second surface of the electromagnetic-suction device opposite of the first surface.

In some forms, the apparatus further includes a plurality of the auxiliary suction devices, where each auxiliary suction device of the plurality of auxiliary suction devices contacts the electromagnetic device.

In some forms, the electromagnetic-suction device is configured to remove the blank from the stack of blanks in response to receiving electrical power.

In some forms, the primary suction device is configured to generate a vacuum force to remove the blank from the stack of blanks.

In some forms, the electromagnetic device is configured to receive electrical power and the primary suction device is configured to generate a vacuum force in response to the electromagnetic device receiving electrical power.

The present disclosure provides an apparatus for destacking a blank from a stack of blanks. The apparatus includes an electromagnetic-suction device configured to remove the blank from the stack of blanks and including a primary suction device and an electromagnetic device. The electromagnetic device defines an aperture and the electromagnetic device includes an electromagnetic coil. The primary suction device includes a shaft extending through the aperture of the electromagnetic-device and a suction cup connected at one end of the shaft.

In some forms, the apparatus further comprises at least one auxiliary suction device proximate to the electromagnetic-suction device auxiliary suction device.

In some forms, the apparatus further includes a manifold, where the manifold contacts a first surface of the electromagnetic-suction device, and where the at least one auxiliary suction device contacts a second surface of the electromagnetic device opposite of the first surface.

In some forms, the electromagnetic-suction device further includes an auxiliary suction device having an auxiliary shaft and an auxiliary suction cup secured to one end of the shaft.

In some forms, the electromagnetic device includes a body that defines the aperture and the electromagnetic coil is wrapped about the body, and the primary suction device and the auxiliary suction device are disposed in the aperture and secured to the body.

In some forms, the electromagnetic device is configured to receive electrical power and the primary suction device is configured to generate a vacuum force in response to the electromagnetic device receiving electrical power.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
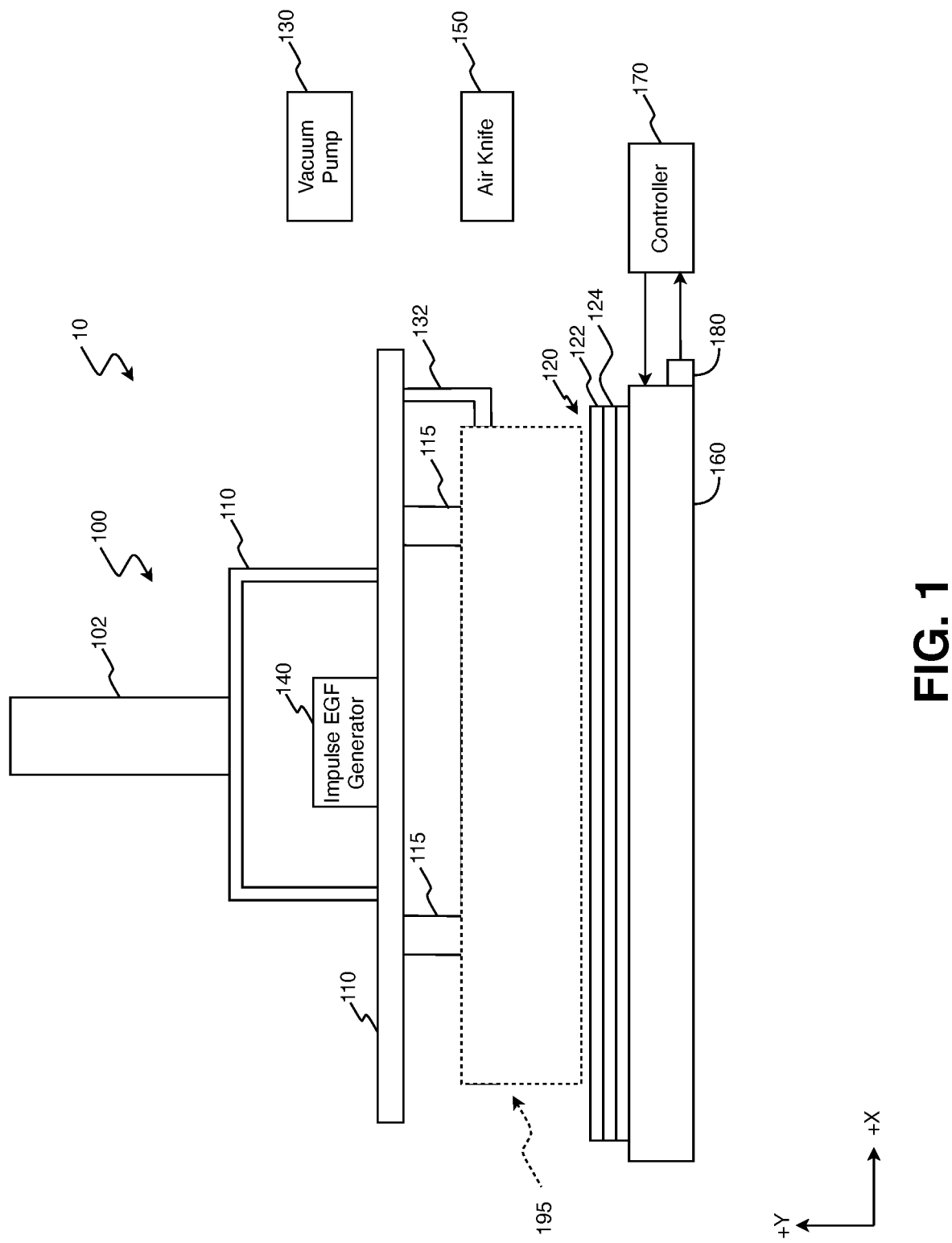
FIG. 1 is a schematic side view of an apparatus for separating a blank from a stack of blanks in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a destacking apparatus configured to remove a blank from a stack of blanks. The destacking apparatus includes an electromagnetic-suction device, which includes a primary suction device integrated with an electromagnetic device. The destacking apparatus also includes an auxiliary suction device. As an example, to integrate the primary suction device with the electromagnetic device, a suction cup of the primary suction device is arranged to contact the electromagnetic device. As another example, to integrate the primary suction device with the electromagnetic device, a shaft of the primary suction device extends in an aperture defined by the electromagnetic device. By integrating the primary suction device with the electromagnetic device, and by including the auxiliary suction device, the efficiency of the destacking process improves. It should be readily understood that the destacking apparatus of the present disclosure addresses other issues and should be limited to the examples provided herein.

Figure 2:
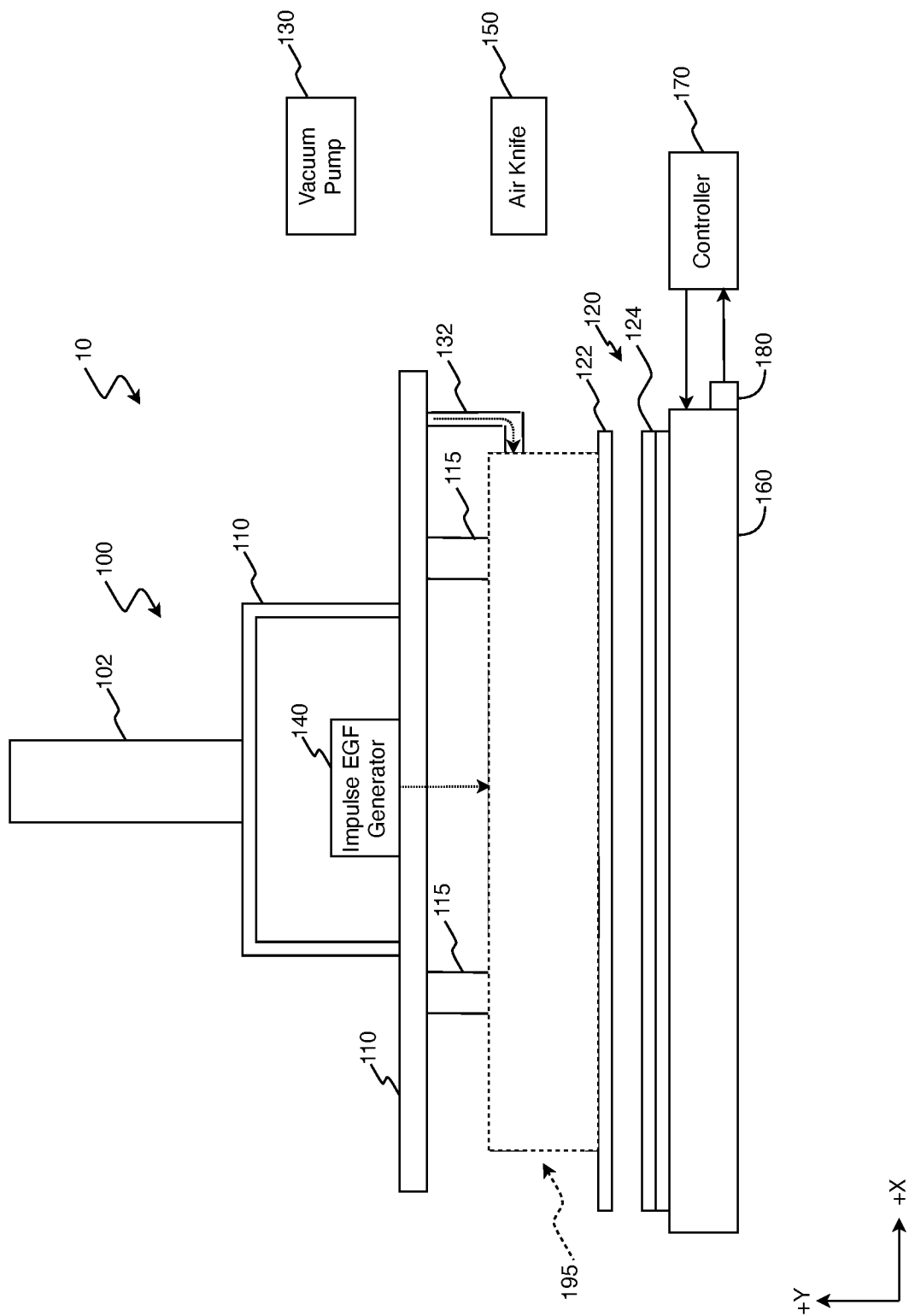
FIG. 2 is a schematic side view of the apparatus of FIG. 1 removing a blank from a stack of blanks.

Referring to FIGS. 1-2, a material handling apparatus 10 for separating a first blank 122 from a stack of blanks 120 and moving the separated first blank 122 to a desired location in accordance with the present disclosure is shown. In one form, the material handling apparatus 10 is part of a stamping line (not shown) in a manufacturing operation using conductive blanks formed from materials including, but not limited to, aluminum, aluminum alloys, steel alloys, among others. In one form, the material handling apparatus 10 includes a transport mechanism, such as a robot 100 having an end-effector 110, a vacuum pump 130, an impulse electrically generated force (EGF) generator 140, an air knife 150, a jig 160, a controller 170, a position sensor 180, and a destacking apparatus 195. Example material handling apparatuses that include destacking apparatuses configured to remove a blank from a stack of blanks are described in U.S. patent application Ser. No. 16/168,026 titled "IMPULSE ELECTRICALLY GENERATED FORCE SEPARATION OF BLANKS FOR THE AUTOMATED DESTACKING OF METAL SHEET," which is commonly owned with the present application and the contents of which are incorporated herein by reference in its entirety.

In one form, the robot 100 includes a robotic arm 102 with the end-effector 110 attached to the robotic arm 102. The robotic arm 102 is configured to move between the stack of blanks 120 and a receiving area (e.g., the stamping press or conveyor) to assist in transferring a blank to the receiving area. In one form, the end-effector 110 includes attachment elements 115 to secure the end-effector 110 to the destacking apparatus 195. The attachment elements 115 may include brackets, mechanical fasteners, and/or adhesives, among other suitable fastening components.

In one form, the material handling apparatus 10 includes a hose 132 to enable vacuum forces generated by the vacuum pump 130 to be provided to the destacking apparatus 195. As described in further detail below, in response to receiving the vacuum forces, the destacking apparatus 195 applies a suction force to the first blank 122 to securely grasp and move the first blank 122 away from the stack of blanks 120.

In one form, the impulse EGF generator 140 is positioned proximate to (i.e., adjacent and/or near) the first blank 122 and removes unwanted blank(s) adhered (stuck) to the first blank 122. More particularly, the impulse EGF generator 140 is configured to provide electrical power to an electromagnetic coil of the destacking apparatus 195 generating an EGF to the stack of blanks 120 that separates the first blank 122 from the stack of blanks. In some forms, the impulse EGF generator 140 may be positioned or attached to the end-effector 110 such that it does not come into physical contact with the first blank 122. The distance between the impulse EGF generator 140 and the first blank 122 may be adjusted and set as a function of a desired magnetically repulsive force to be applied to the material of the blanks 120, the thickness of the blanks 120, the width and/or length of the blanks 120, and the like.

In one form, the air knife 150 is configured to inject air into the stack of blanks 120 as the first blank 122 is grasped by the destacking apparatus 195, and a blank 124 immediately below the first blank 122 is separated from the first blank 122 by a repulsive force resulting from the impulse EGF. It should be readily understood that the air knife 150 may be omitted and is not required to destack the blanks 120. In the following, a blank 124 below the first blank 122 is referenced as an adjacent blank 124.

In one form, the controller 170 is configured to actuate the jig 160 to move the stack of blanks 120 up and down along a Y-direction schematically depicted in the figures. The controller 170 is configured to move the jig 160 and position the stack of blanks 120 to a predetermined height (Y-direction) relative to the end-effector 110 having the destacking apparatus 195. In one form, the position sensor 180 is disposed at the jig 160 and in communication with the controller 170. The position sensor 180 may be configured to transmit a signal corresponding to a position of the jig 160 to the controller 170 such that controller moves the jig 160 upward (+Y-direction) as blanks are removed from the stack of blanks 120.

Figure 3A:
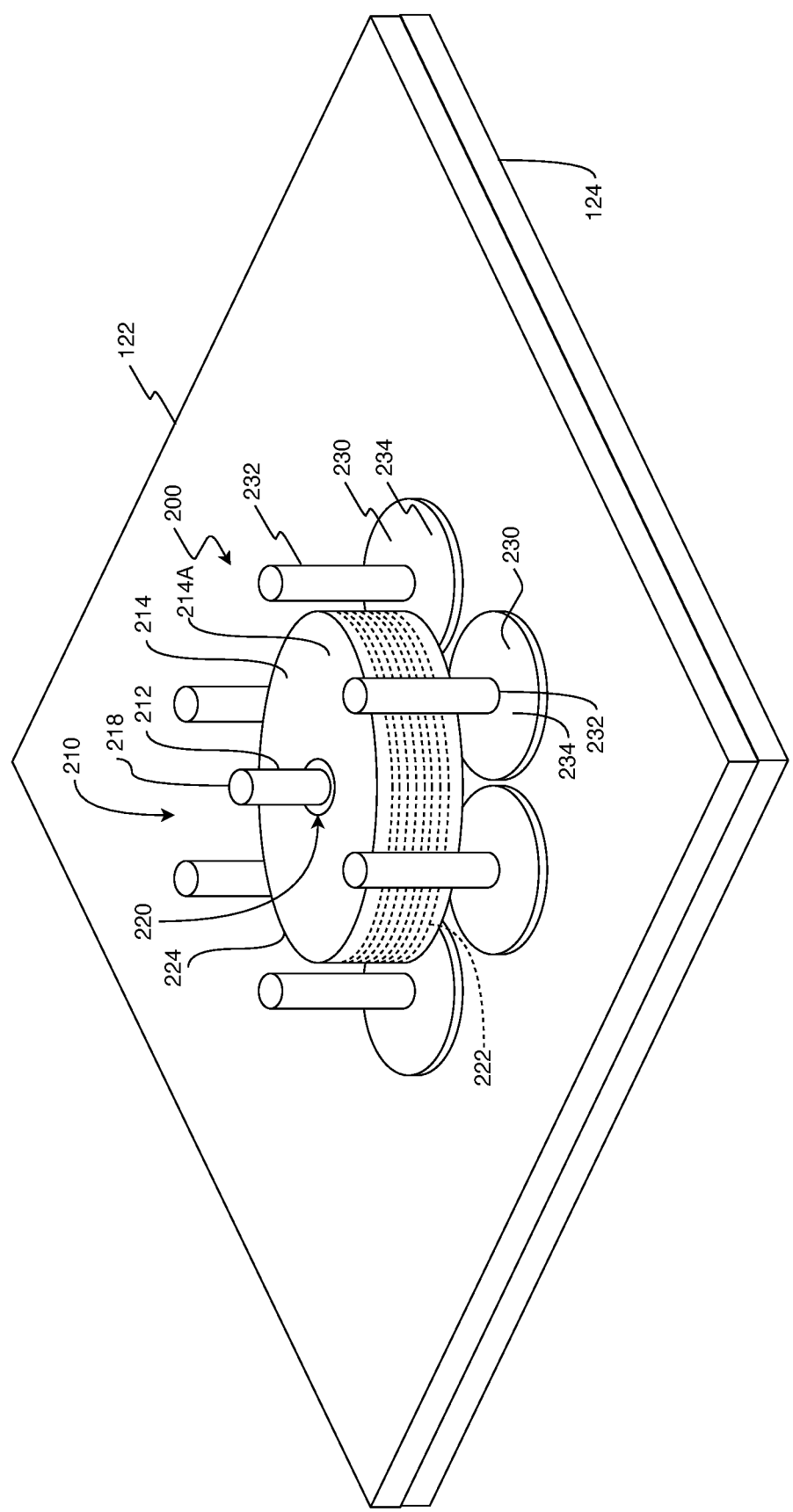
FIG. 3A is a schematic perspective view of an apparatus for separating a blank in another form in accordance with the teachings of the present disclosure.
Figure 3B:
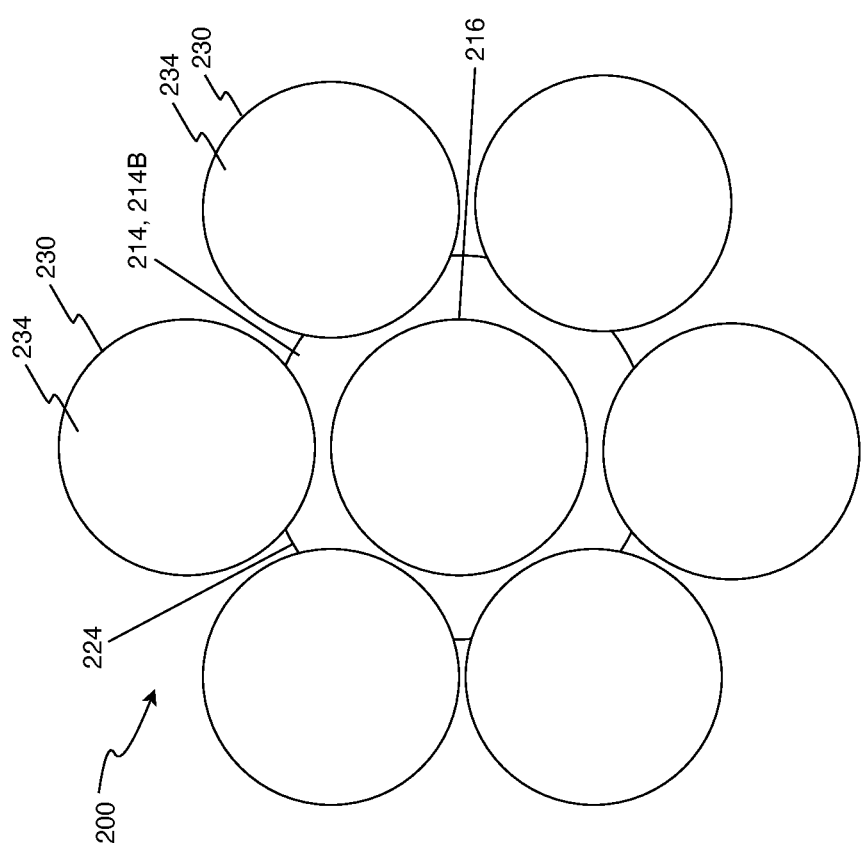
FIG. 3B is a schematic bottom view of the apparatus of FIG. 3A.

With reference to FIGS. 3A-3B, a schematic view of a destacking apparatus 200 is shown and can be used as the destacking apparatus 195. In some forms, the destacking apparatus 200 includes an electromagnetic-suction device 210 that includes a primary suction device 212 and an electromagnetic device 214 having surfaces 214A, 214B. The electromagnetic device 214 defines an aperture 220 and includes an electromagnetic coil 222 and a body 224.

The primary suction device 212 is integrated with the electromagnetic device 214 and includes a primary suction cup 216 and a primary shaft 218. In one form, the primary suction cup 216 may be made of an elastic, flexible material, such as a silicone material. The primary suction cup 216 may be positioned proximate the surface 214B of the electromagnetic device 214. As an example, the primary suction cup 216 contacts the surface 214B of the electromagnetic device 214. The primary shaft 218 is disposed at the aperture 220 and extends through at least a thickness of the body 224 with the primary suction cup 216 connected to one end of the primary shaft 218. In one form, the primary shaft 218 may be made of iron, carbon fiber-reinforced plastic, or other similar materials. In one form, the primary suction device 212 is fluidly coupled to the vacuum pump 130 to generate a suction force. More particularly, in one form, the primary shaft 218 defines a fluid passage extending therein and is fluidly coupled to the hose 132 at the end of the primary shaft 218 that is opposite of the suction cup.

In some forms, the electromagnetic coil 222 is made of any suitable electrically conductive material, such as copper, silver, aluminum, gold, an alloy thereof, among other electrically conductive materials. The electromagnetic coil 222 is electrically coupled to the impulse EGF generator 140 via, for example, a hardwire coupling or an inductive coupling to receive electric power. The electromagnetic coil 222 is provided within the body 224 and is configured to be disposed about the primary shaft 218. As an example, the electromagnetic coil 222 is wound around the body 224 such that one or more coil loops at a given diameter are formed. In one form, the body 224 is made of any suitable magnetic material having a sufficient magnetic permeability to enable magnetically repulsive forces generated by the impulse EGF generator 140 to separate the first blank 122 from the stack of blanks 120 (e.g., solid metals, powdered metals, ceramics, among others).

In some forms, the destacking apparatus 200 includes a plurality auxiliary suction devices 230. Each auxiliary suction device 230 includes an auxiliary shaft 232 and an auxiliary suction cup 234 disposed at one end of the auxiliary shaft 232. In one form, the auxiliary shafts 232 may be made of iron, carbon fiber-reinforced plastic, or other similar materials. In one form, the auxiliary suction cups 234 may be made of an elastic, flexible material, such as a silicone material. The auxiliary suction cups 234 are positioned proximate the surface 214B of the electromagnetic device 214 and, in one form, partially contact the surface 214B of the electromagnetic device 214. In another form, the auxiliary suction cups 234 are not in contact with the surface 214B of the electromagnetic device 214. Similar to the primary suction device 212, the auxiliary suction devices 230 are fluidly coupled to the vacuum pump 130 to generate a suction force. More particularly, in one form, the auxiliary shafts 232 defines a fluid passage extending therein and is fluidly coupled to the hose 132 at the end of the auxiliary shaft 232 that is opposite of the auxiliary suction cup 234.

With a plurality of the auxiliary suction devices 230, the devices 230 may be distributed about the electromagnetic-suction device 210, as shown, or arranged in other suitable manner to provide auxiliary suction force for engaging with the first blank 122, as described herein. While a plurality of auxiliary suction devices 230 are provided in the figure, one or more auxiliary suction devices may be employed. While the destacking apparatus 200 illustrated in FIGS. 3A-3B include the primary suction device 212 and the auxiliary suction device 230, it should be understood that the destacking apparatus 200 may not include the auxiliary suction device 230 in other forms.

During operation to remove the first blank 122, the impulse EGF generator 140 provides electrical power to the electromagnetic coil 222 and the alternating electrical current in the electromagnetic coil 222 creates an alternating magnetic field proximate to the first blank 122 and the adjacent blank 124. As such, the alternating magnetic fields generate a magnetically repulsive force against the adjacent blank 124 such that the adjacent blank 124 is separated from the first blank 122. In some forms, the magnetically repulsive force elastically deforms, but does not plastically deform, the first blank 122 and/or the adjacent blank 124 such that the seal (e.g., a film, layer of lubricant, adhesive, among others) between the first blank 122 and the adjacent blank 124 is broken and the adjacent blank 124 is separated from the first blank 122.

Figure 3C:
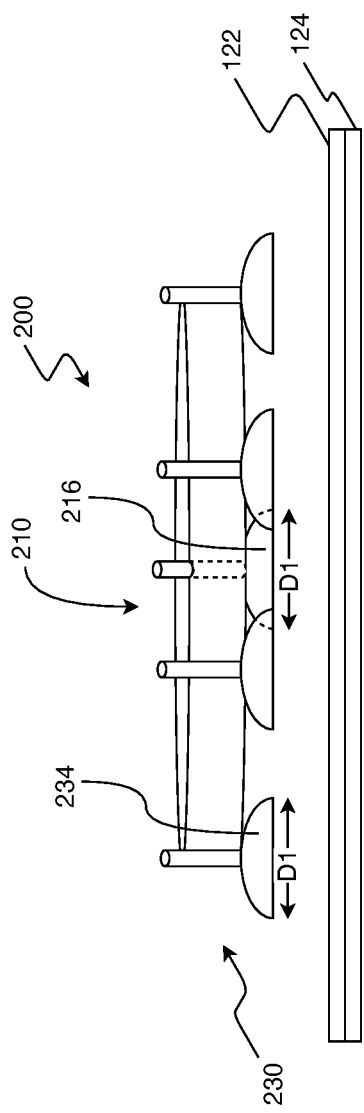
FIG. 3C is a schematic perspective view of the apparatus of FIG. 3A.
Figure 3D:
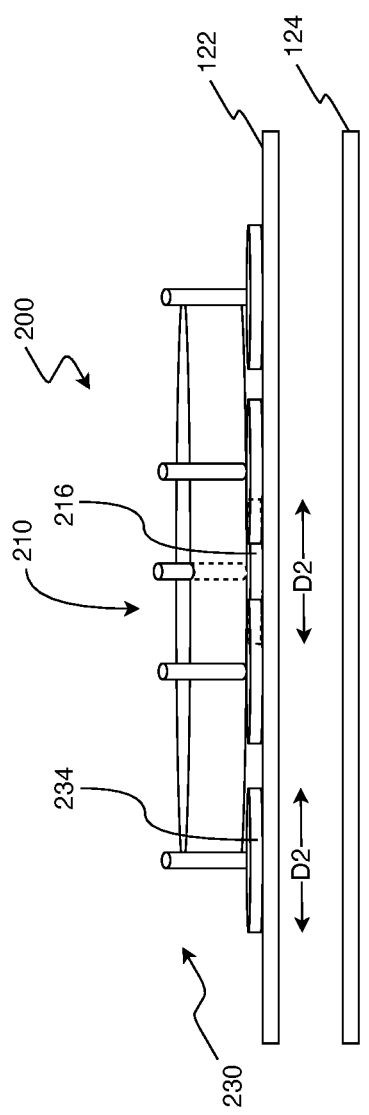
FIG. 3D is a schematic perspective view of the apparatus of FIG. 3A attached to the blank.

Furthermore, during operation of the vacuum pump 130, the primary suction cup 216 and the auxiliary suction cups 234 are configured to contact and seal against the first blank 122 to lift the first blank 122. Specifically, the primary suction cup 216 and the auxiliary suction cups 234 contact the first blank 122 and in response to a vacuum force being applied by the vacuum pump 130 and/or the destacking apparatus 200 applying a contact force to the first blank 122, the diameters of the primary suction cup 216 increase. As an example, when the vacuum pump 130 is not applying the vacuum forces and the destacking apparatus 200 is not applying the contact force to the first blank 122, the primary suction cup 216 and the suction cups 234 may have a nominal diameter D1, as schematically depicted in FIG. 3C. When the vacuum pump 130 applies the vacuum force and/or the destacking apparatus 200 applies the contact force to the first blank 122, the primary suction cup 216 and the at least one auxiliary suction cup 234 are pressed onto the first blank 122 to contact, grasp, and move the first blank 122. As such, when the vacuum force and/or contact force is applied, the primary suction cup 216 and the auxiliary suction cups 234 have a contact diameter D2 greater than the nominal diameter D1, as schematically depicted in FIG. 3D. While the primary suction cup 216 and each of the at least one auxiliary suction cups 234 are shown as having the nominal diameter D1 and the contact diameter D2, it should be understood that the primary suction cup 216 and at least a set of the auxiliary suction cups 234 may have different nominal diameters and contact diameters in other forms.

Figure 4A:
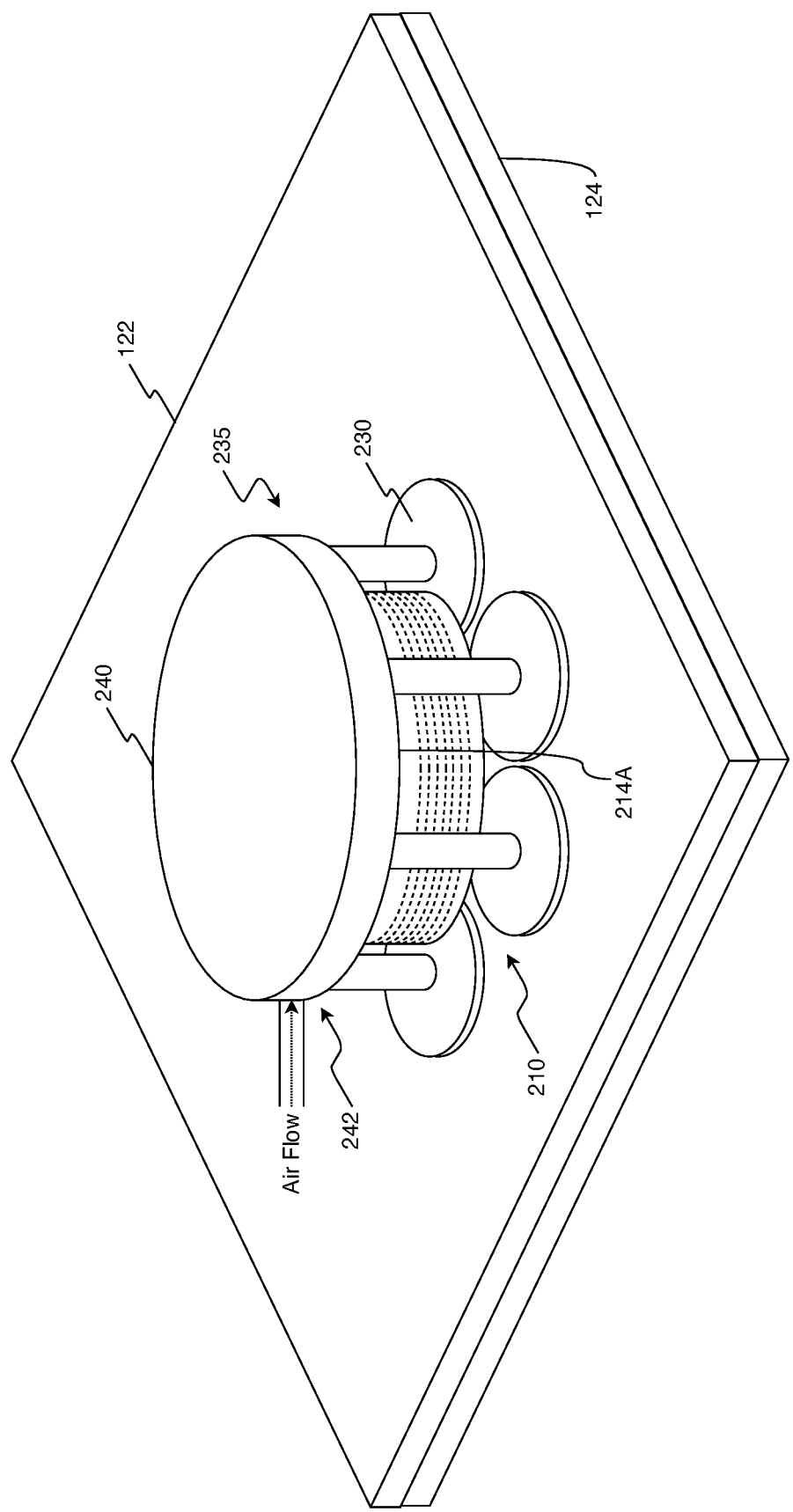
FIG. 4A is a schematic perspective view of another apparatus for separating a blank from a stack of blanks in accordance with the teachings of the present disclosure.
Figure 4B:
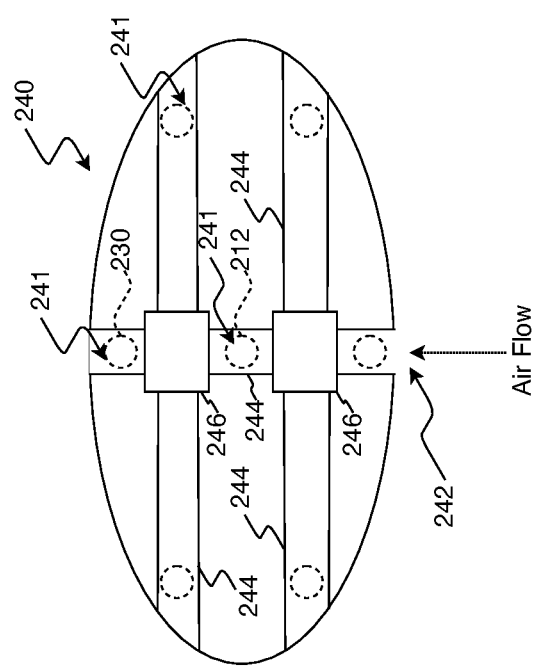
FIG. 4B is a schematic cross-sectional view of the apparatus of FIG. 4A.

With reference to FIGS. 4A-4B, a destacking apparatus 235 is shown and can be provided as the destacking apparatus 195. The destacking apparatus 235 is similar to the destacking apparatus 200 described above, but in this form, the destacking apparatus 235 may also include a manifold 240 to facilitate the flow of vacuum forces from the vacuum pump 130 to the primary suction device 212 and the auxiliary suction devices 230. In some forms, the manifold 240 may contact the surface 214A of the electromagnetic device 214. In some forms, the primary shaft 218 and the auxiliary shafts 232 contact the manifold 240 and/or are partially disposed at apertures 241 of the manifold 240. The manifold 240 includes an inlet port 242 that connects the destacking apparatus 235 to the vacuum pump 130 via the hose 132. In one form, the manifold 240 includes a plurality of channels 244 and valves 246 that are configured to direct air to the vacuum pump 130 over the primary suction device 212 and the auxiliary suction devices 230. While the manifold 240 is shown as having a cylindrical shape, it should be understood that the manifold 240 can have various other shapes in other forms and is not limited to the shape illustrated herein.

Figure 5:
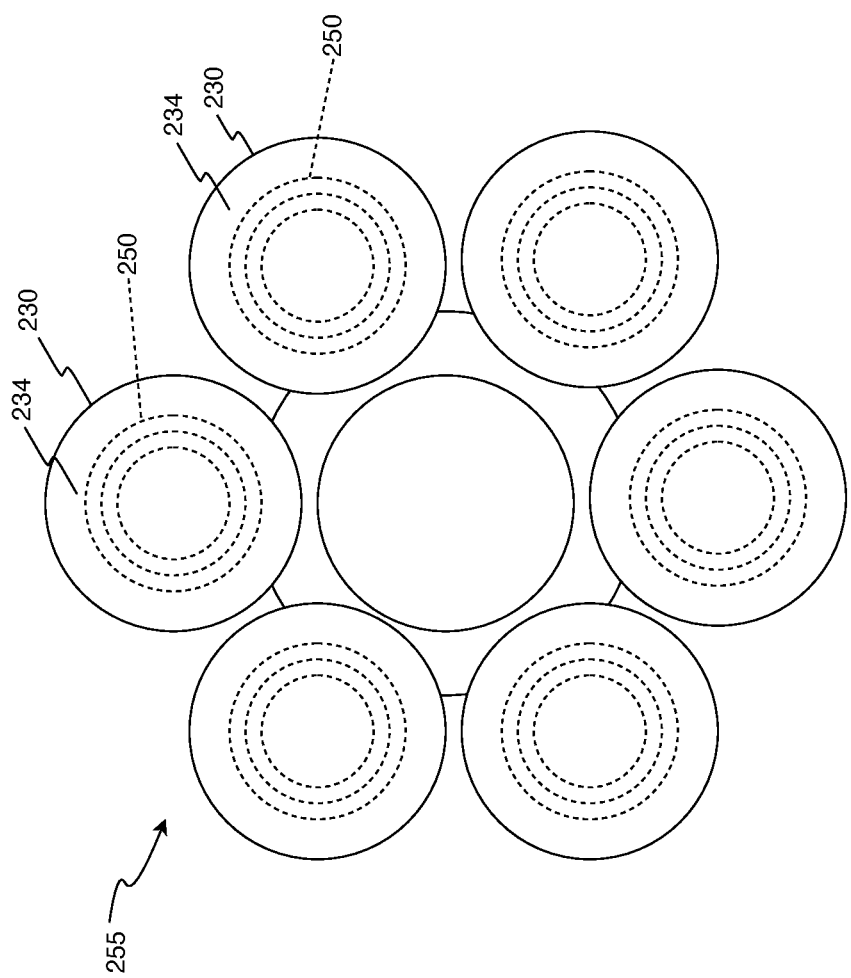
FIG. 5 is a schematic bottom view of another apparatus for separating a blank from a stack of blanks in accordance with the teachings of the present disclosure.

With reference to FIG. 5, a bottom view of a destacking apparatus 255 is shown, where the destacking apparatus 255 may be employed as the destacking apparatus 195. The destacking apparatus 255 is similar to the destacking apparatuses 200, 235 described above, but in this form, the at least one auxiliary suction cups 234 of the destacking apparatus 255 include auxiliary electromagnetic coils 250 to form one or more coil loops at a given diameter. The auxiliary electromagnetic coils 250 are made of any suitable electrically conductive material, such as copper, silver, aluminum, gold, an alloy thereof, among other electrically conductive materials. In one form, the auxiliary electromagnetic coils 250 are disposed within the at least one auxiliary suction cups 234 during an overmolding process and are electrically coupled to the impulse EGF generator 140. Accordingly, the coil loops formed by the auxiliary electromagnetic coils 250 increase the magnetic field strength as the impulse EGF generator 140 generates electrically power, thereby increasing the magnetically repulsive force applied against the adjacent blank 124 when removing the first blank 122 from the stack of blanks 120.

Figure 6:
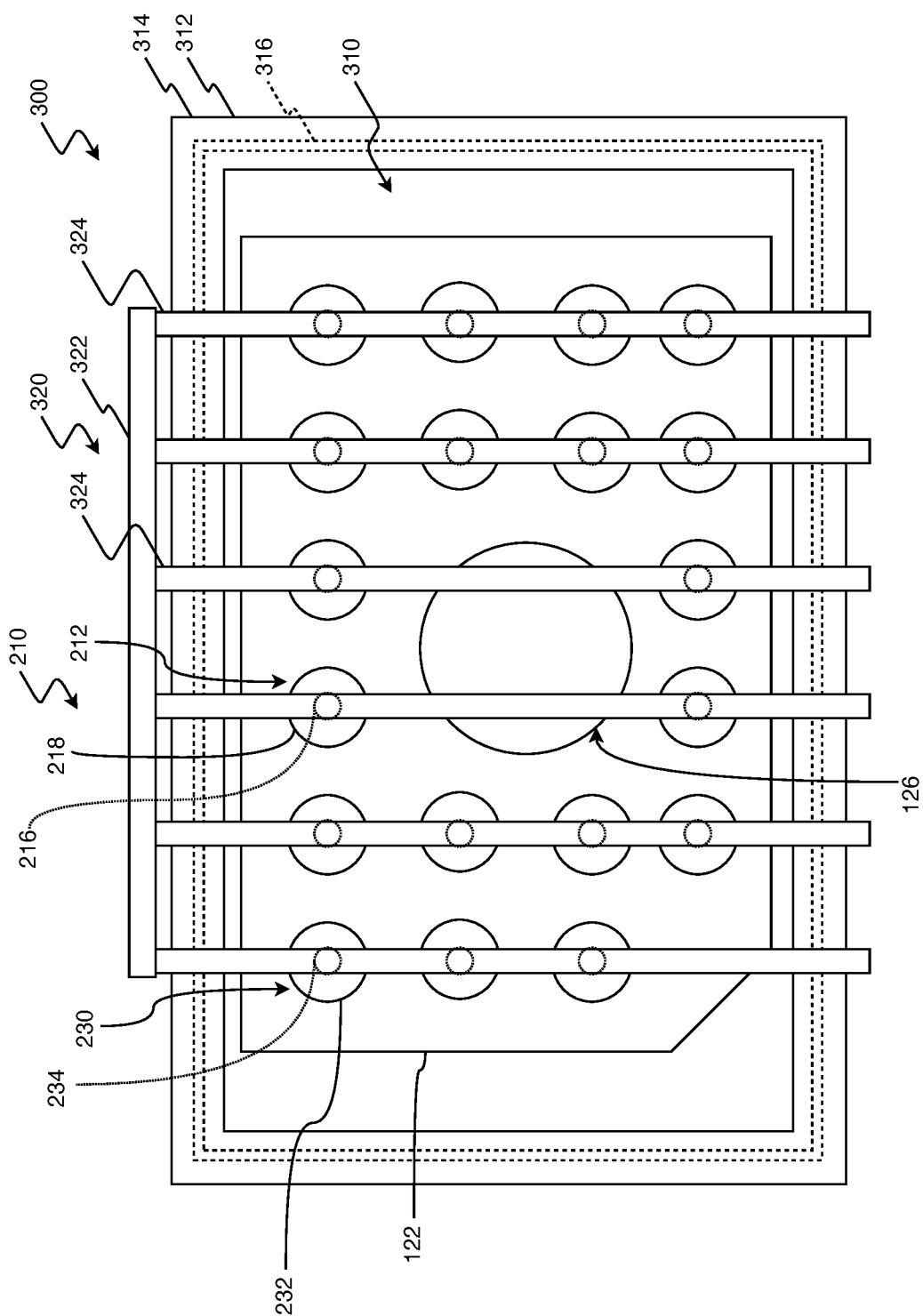
FIG. 6 is a schematic top view of yet another example apparatus for separating a blank from a stack of blanks in accordance with the teachings of the present disclosure.
Figure 7:
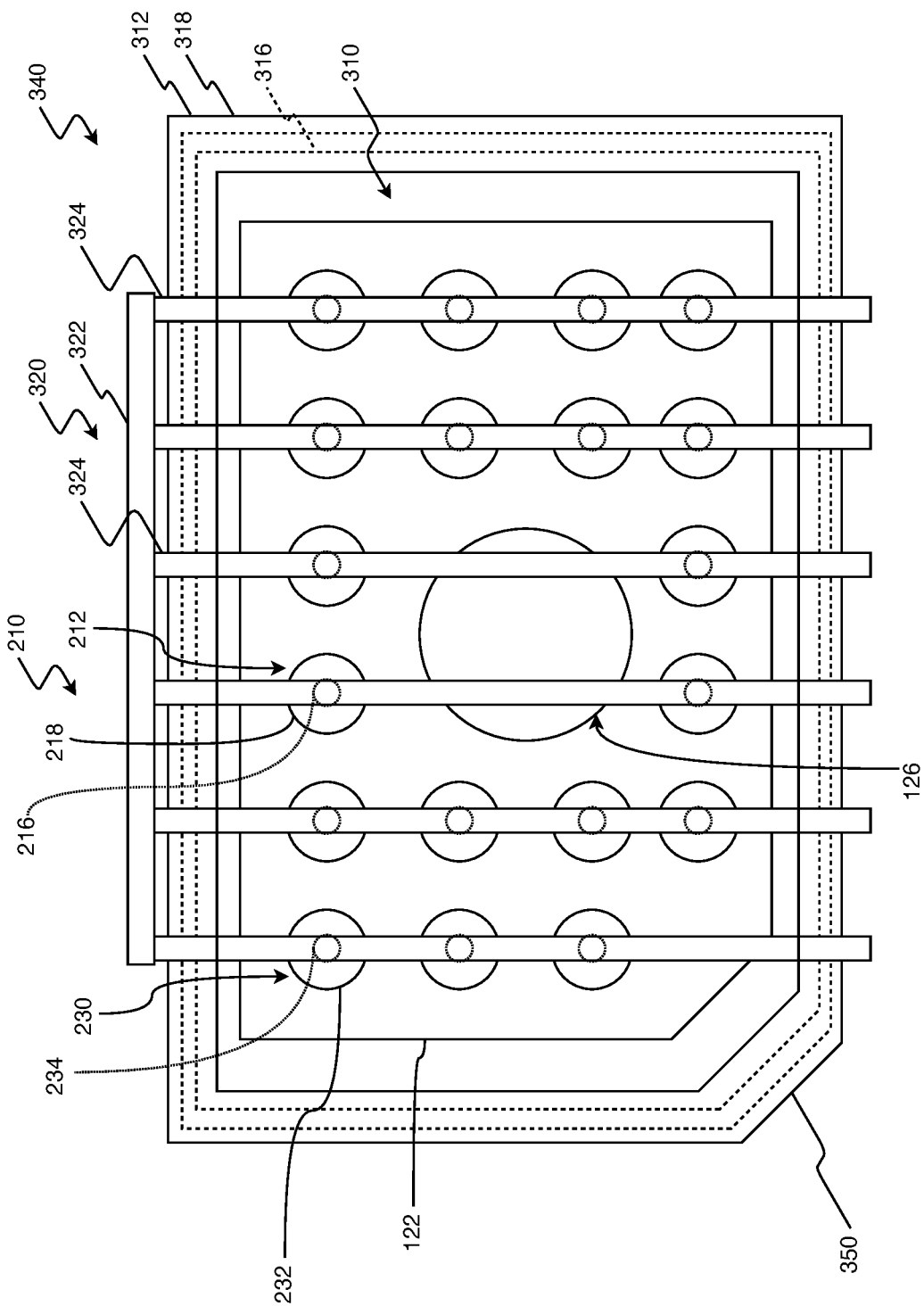
FIG. 7 is a schematic top view of yet another example apparatus for separating a blank from a stack of blanks in accordance with the teachings of the present disclosure.

With reference to FIG. 6 and FIG. 7, a schematic view of destacking apparatus 300 and 340 are shown respectively and may be employed as the destacking apparatus 195. The destacking apparatus 300 is similar to the destacking apparatuses 200, 235, 255. However, in this form, the primary suction device 212 and each of the at least one auxiliary suction devices 230 are disposed in aperture 310 formed by body 314 of electromagnetic device 312. Furthermore, the primary suction device 212 and the auxiliary suction devices 230 are arranged to accommodate for the geometry of the first blank 122. As an example, the primary suction device 212 and the auxiliary suction devices 230 are provided in an array to match the contours of the first blank 122 and to surround aperture 126 defined by the first blank 122.

In one form, the body 314 and/or electromagnetic coil 316 have a shape to accommodate for the geometry of the first blank 122. As an example and as shown in FIG. 7, the destacking apparatus 340 is similar to that of destacking apparatus 300, but includes a body 318 having a corner 350 to correspond with a shape and/or contour to match the shape and/or contours of the first blank 122.

With reference to FIGS. 6-7, in some forms, the destacking apparatus 300, 340 includes a manifold 320 to facilitate the flow of vacuum forces from the vacuum pump 130 to the primary suction device 212 and the auxiliary suction devices 230. The manifold 320 may include a header 322 that connects the destacking apparatus 300 to the vacuum pump 130 via the hose 132. In one form, the manifold 320 includes a plurality of submanifolds 324 that are configured to direct air to the vacuum pump 130 over the primary suction device 212 and the at least one auxiliary suction devices 230.

The destacking apparatuses 235, 255, 300, and 340 operate in a similar manner as that of destacking apparatus 200, and for purposes of brevity, the operation of the apparatuses 235, 255, 300, and 340 is omitted.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

What is claimed is:

1. An apparatus for destacking a blank from a stack of blanks, the apparatus comprising:
    an electromagnetic-suction device including a primary suction device and an electromagnetic device, wherein the primary suction device is integrated with the electromagnetic device; and
    an auxiliary suction device proximate to the electromagnetic-suction device, wherein the auxiliary suction device includes an auxiliary suction cup and an auxiliary shaft attached to the auxiliary suction cup, and wherein the auxiliary suction cup is adapted to contact the blank, and wherein the auxiliary suction cup contacts the electromagnetic device.

2. The apparatus of claim 1, wherein the primary suction device includes a suction cup that is arranged at a first face of the electromagnetic device to directly contact the blank.

3. The apparatus of claim 1, wherein the electromagnetic device defines an aperture and includes an electromagnetic coil.

4. The apparatus of claim 3, wherein the primary suction device includes a shaft extending through the aperture and a suction cup connected at one end of the shaft.

5. The apparatus of claim 4, wherein the electromagnetic coil is disposed about the shaft.

6. The apparatus of claim 1, wherein the auxiliary suction cup includes an auxiliary electromagnetic coil disposed therein.

7. The apparatus of claim 1 further comprising a manifold, wherein:
the manifold contacts a first surface of the electromagnetic-suction device; and
the auxiliary suction device contacts a second surface of the electromagnetic-suction device opposite of the first surface.

8. The apparatus of claim 1 further comprising a plurality of the auxiliary suction devices, wherein each auxiliary suction device of the plurality of auxiliary suction devices contacts the electromagnetic device.

9. The apparatus of claim 1, wherein the electromagnetic-suction device is configured to remove the blank from the stack of blanks in response to receiving electrical power.

10. The apparatus of claim 9, wherein the primary suction device is configured to generate a vacuum force to remove the blank from the stack of blanks.

11. The apparatus of claim 1, wherein the electromagnetic device is configured to receive electrical power and the primary suction device is configured to generate a vacuum force in response to the electromagnetic device receiving electrical power.

12. An apparatus for destacking a blank from a stack of blanks, the apparatus comprising:
an electromagnetic-suction device configured to remove the blank from the stack of blanks and including a primary suction device and an electromagnetic device;
a manifold; and
at least one auxiliary suction device proximate to the electromagnetic-suction device, wherein:
the electromagnetic device defines an aperture and the electromagnetic device includes an electromagnetic coil,
the primary suction device includes a shaft extending through the aperture of the electromagnetic device and a suction cup connected at one end of the shaft,
the manifold contacts a first surface of the electromagnetic-suction device, and
the at least one auxiliary suction device contacts a second surface of the electromagnetic device opposite of the first surface.

13. The apparatus of claim 12, wherein the electromagnetic-suction device further includes an auxiliary suction device having an auxiliary shaft and an auxiliary suction cup secured to one end of the shaft.

14. The apparatus of claim 13, wherein:
the electromagnetic device includes a body that defines the aperture and the electromagnetic coil is wrapped about the body; and
the primary suction device and the auxiliary suction device are disposed in the aperture and secured to the body.

15. The apparatus of claim 12, wherein the electromagnetic device is configured to receive electrical power and the primary suction device is configured to generate a vacuum force in response to the electromagnetic device receiving electrical power.

* * * * *